United States Patent Office 2,976,236
Patented Mar. 21, 1961

2,976,236

PROCESS FOR THE CONTROL OF BACTERIA IN WATER FLOODING OPERATIONS

Edward O. Bennett, Houston, Tex., and Edward B. Hodge, Terre Haute, Ind., assignors to Commercial Solvents Corporation, New York, N.Y., a corporation of Maryland No Drawing. Filed Oct. 3, 1958, Ser. No. 765,032

12 Claims. (Cl. 252—8.55)

Our invention relates to the control of bacteria in water flooding operations used in the secondary recovery of petroleum oils, and more particularly, to controlling such organisms by incorporating into the flooding water effective amounts of nitroesters having the following structural formula:

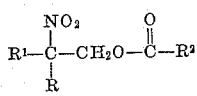

where R is selected from the group consisting of hydrogen, chloro, bromo, methyl, ethyl and propyl; $R^1$ is selected from the group consisting of alkyl having up to four carbon atoms and

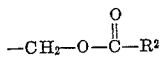

and $R^2$ is alkyl having up to twenty carbon atoms.

U.S. Patent No. 2,839,467 lists many of the problems found in the secondary oil recovery art and the means whereby some of these problems have been solved. The problem of controlling sulfate reducing bacteria is ever present and always difficult, as the growth of the microorganisms is not controlled by economically practicable amounts of many bactericides generally utilized in bacterial control and the microorganisms sometimes become resistant to generally used bactericides.

The problems attending the control of other microorganisms are more easily solved but are, nevertheless, present. These microorganisms are generally controlled by moderate amounts of known bactericides.

We have now discovered that noxious microorganisms are economically controlled by our above described nitroesters. Compounds which we have found to be operative in our process include: 2-chloro-2-nitro-1-butanol stearate, 2-nitro-2-methyl-1,3 - propanediol diacetate, 2-nitro - 1-butylpropionate, tris(hydroxy-methyl) nitromethane triacetate, 2-bromo-2-nitropropyl acetate, and 2-nitro-isobutyl stearate, etc.

The usual procedure for treatment of water to be utilized in flooding operations is to produce a concentrate of the bactericide in water and then continuously inject this concentrate into the water to be used in flooding operations at a rate which forms a desired dilution of the bactericide. This is done prior to pumping the water into the oil bearing subterranean formation.

Sampling and checking of the water for sulfate reducing bacteria will show whether the chemical concentration needs to be raised or maybe lowered to control effectively the bacteria count of the flooding water.

Alternately, the bactericides utilized in our process may be added to the oil bearing formations periodically, for example, once a week, as a high potency concentrate or the undiluted bactericide may be injected into the formation.

We have found that the compounds utilized in our process are active against some strains of bacteria in water at concentrations as low as about 2-5 p.p.m. However, we prefer to utilize concentrations in excess of about 15-25 p.p.m. as we have found that even resistant strains Desulfovibrio desulfuricans are effectively controlled at these concentrations.

It is to be understood, of course, that not all of the compounds used in our process are effective to the same degree. The following table sets out concentrations at which we have found representative nitroesters to be completely effective against a resistant strain of Desulfovibrio desulfuricans in water flooding operations.

TABLE

| Nitroester | Effective Concentration (p.p.m.) |
|---|---|
| 2-chloro-2-nitro-1-butanol stearate | 25 |
| 2-nitro-2-chloro-1,3-propanediol diacetate | 100 |
| 2-nitro-2-methyl-1,3-propanediol diacetate | 250 |
| 2-nitro-2-ethyl-1,3-propanediol diacetate | 250 |
| 2-nitro-1-butylpropionate | 250 |
| 2-nitro-1-butyl acetate | 500 |
| 2-nitro-2-ethyl-1,3-propanediol dipropionate | 500 |
| 2-nitro-1-propyl acetate | 500 |
| 2-bromo-2-nitropropyl acetate | 500 |
| 2-nitro-2-methyl-1,3-propanediol dipropionate | 500 |
| 2-nitroisobutyl acetate | 1,000 |
| 2-nitroisobutyl stearate | 1,000 |

The following example sets out the procedure used in testing our nitroesters for the control of sulfate reducing microorganisms. It is not intended that our invention be limited to the exact compositions or concentrations shown. Rather, it is intended that all equivalents obvious to those skilled in the art be included within the scope of our invention as claimed.

*Example I*

In a water treatment plant, a water concentrate containing 2-chloro-2-nitro-1-butanol stearate is continually added to water to be pumped into a subterranean oil bearing formation at such a rate that a 25 p.p.m. solution of the nitroester is formed. The nitroester treated flooding water is pumped into the oil bearing formation and is completely effective in preventing bacterial plugging of the oil bearing sands and the piping system utilized in the water flooding operations.

Now having described our invention, what we claim is:

1. In the process of secondary oil recovery characterized by the step of injecting flooding water into oil bearing subterranean formations to displace portions of the residual oil therein, the improvement comprising having present in said injected flooding water in excess of 2-5 p.p.m. of a nitroester having the following structural formula:

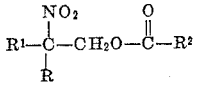

where R is selected from the group consisting of hydrogen, chloro, bromo, methyl, ethyl and propyl; $R^1$ is selected from the group consisting of alkyl having up to four carbon atoms and

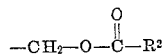

and $R^2$ is alkyl having up to twenty carbon atoms, to inhibit the growth of bacteria within said formations.

2. In a flooding process for the recovery of oil from oil bearing subterranean formations, the improvement which comprises flooding the oil bearing subterranean formation with an aqueous liquid containing in excess of 15 to about 25 p.p.m. of a nitroester having the following structural formula:

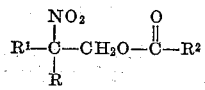

where R is selected from the group consisting of hydrogen, chloro, bromo, methyl, ethyl and propyl; $R^1$ is selected from the group consisting of alkyl having up to four carbon atoms and

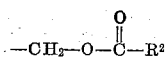

and $R^2$ is alkyl having up to twenty carbon atoms, to inhibit the growth of bacteria within said formations.

3. The process of claim 2 wherein the nitroester is 2-chloro-2-nitro-1-butanol stearate.

4. The process of claim 2 wherein the nitroester is 2-nitro-2-chloro-1,3-propanediol diacetate.

5. The process of claim 2 wherein the nitroester is 2-nitro-2-methyl-1,3-propanediol diacetate.

6. The process of claim 2 wherein the nitroester is 2-nitro-2-ethyl-1,3-propanediol diacetate.

7. The process of claim 2 wherein the nitroester is 2-nitro-1-butylpropionate.

8. The process of claim 2 wherein the nitroester is 2-nitro-1-butylacetate.

9. The process of claim 2 wherein the nitroester is 2-nitro-2-ethyl-1,3-propanediol dipropionate.

10. The process of claim 2 wherein the nitroester is 2-nitro-1-propylacetate.

11. The process of claim 2 wherein the nitroester is 2-bromo-2-nitropropyl acetate.

12. The process of claim 2 wherein the nitroester is 2-nitro-2-methyl-1,3-propanediol dipropionate.

References Cited in the file of this patent

UNITED STATES PATENTS

| | | |
|---|---|---|
| 2,419,021 | Harnden | Apr. 15, 1947 |
| 2,427,821 | Tindall | Sept. 23, 1947 |
| 2,488,650 | Tindall | Nov. 22, 1949 |
| 2,651,590 | Karsten | Sept. 8, 1953 |
| 2,692,231 | Stayner et al. | Oct. 19, 1954 |
| 2,839,467 | Hutchinson et al. | June 17, 1958 |

FOREIGN PATENTS

| | | |
|---|---|---|
| 107,419 | Australia | May 25, 1939 |
| 421,189 | Italy | Mar. 19, 1947 |